United States Patent [19]
Van Gundy

[11] 3,862,487
[45] Jan. 28, 1975

[54] CHAIN POSITIONER FOR 10-SPEED BICYCLE

[76] Inventor: Kenneth Warren Van Gundy, 25 Arroyo Ct., San Mateo, Calif. 94402

[22] Filed: Apr. 30, 1973

[21] Appl. No.: 356,023

[52] U.S. Cl. .................. 29/270, 29/200 P, 269/47, 269/321 W
[51] Int. Cl. ........................................ B25b 27/22
[58] Field of Search ......... 29/200 P, 267, 270, 271, 29/278, 283, 200 D; 269/49, 70, 321 W; 74/217 B, 242.11 B, 242.14 B, 242.15 B

[56] References Cited
UNITED STATES PATENTS
1,261,164  4/1918  Quinlan .............................. 29/267

FOREIGN PATENTS OR APPLICATIONS
1,030,589  6/1953  France ............................... 74/217 B

*Primary Examiner*—Al Lawrence Smith
*Assistant Examiner*—Harold P. Smith, Jr.
*Attorney, Agent, or Firm*—Townsend & Townsend

[57] ABSTRACT

A chain positioner tool for facilitating removal and installation of a wheel having one or more gears assembled thereto, such as the rear wheel on a multi-speed bicycle, driven by a chain and chain tensioner assembly comprising an anchor plate adapted to be secured to the wheel fork, a chain retractor having a plurality of claw-like projections arranged along an arcuate path for supporting the chain free of the gear and a member for holding the chain tensioner in a tension relieving position.

11 Claims, 11 Drawing Figures

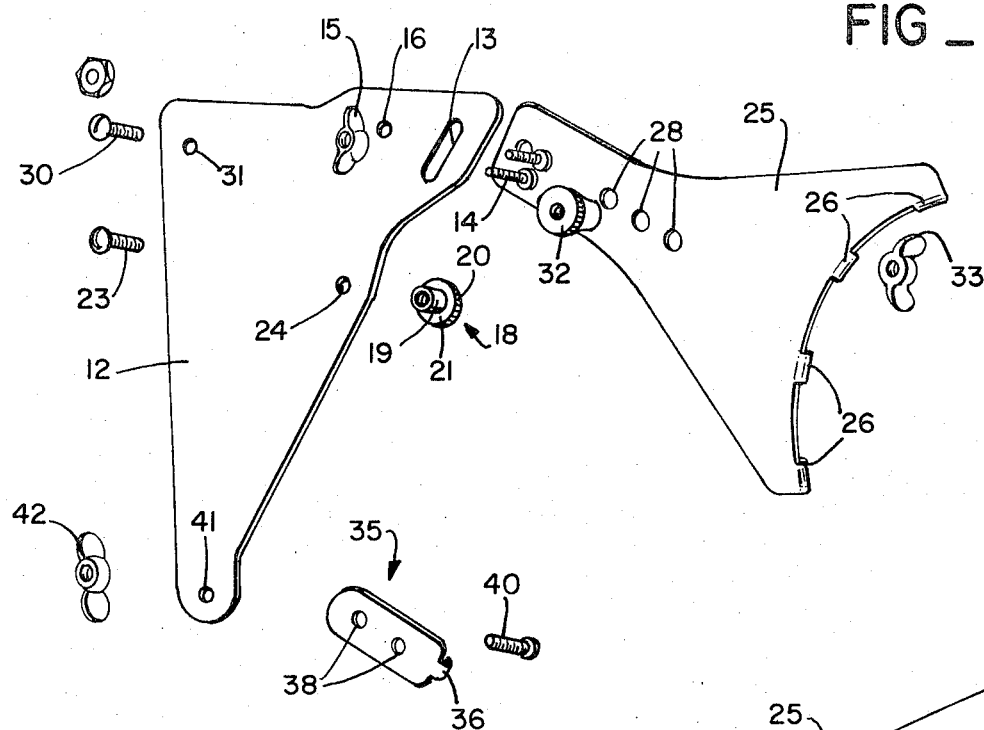
FIG_1
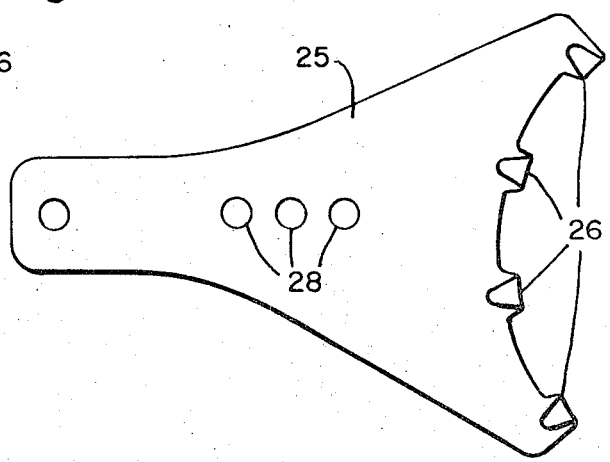
FIG_2
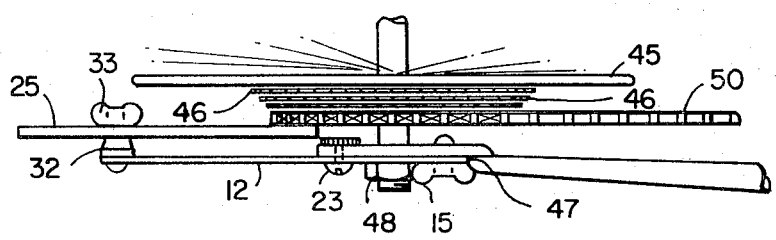
FIG_9
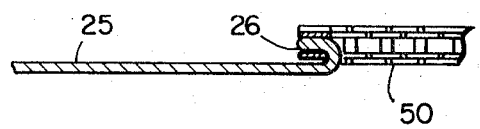
FIG_10
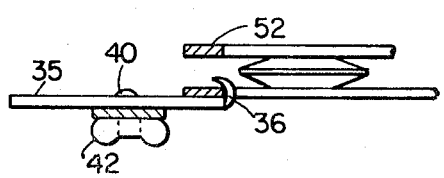
FIG_11

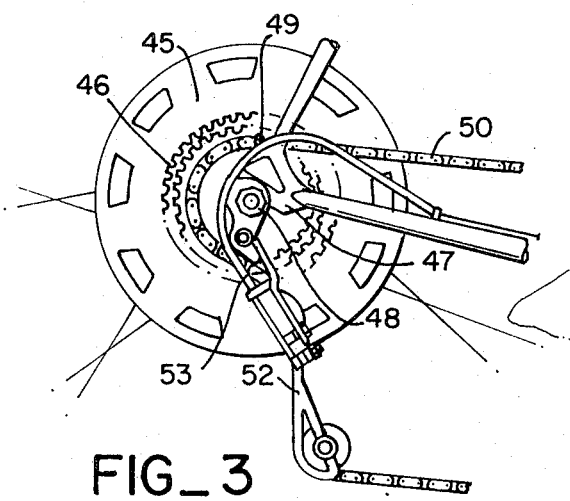
FIG_3
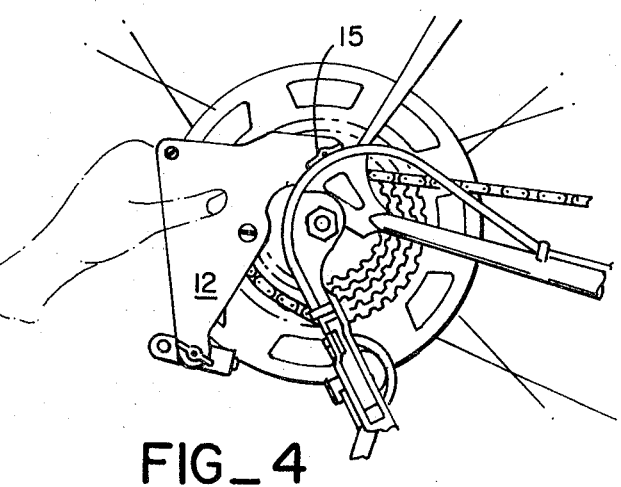
FIG_4
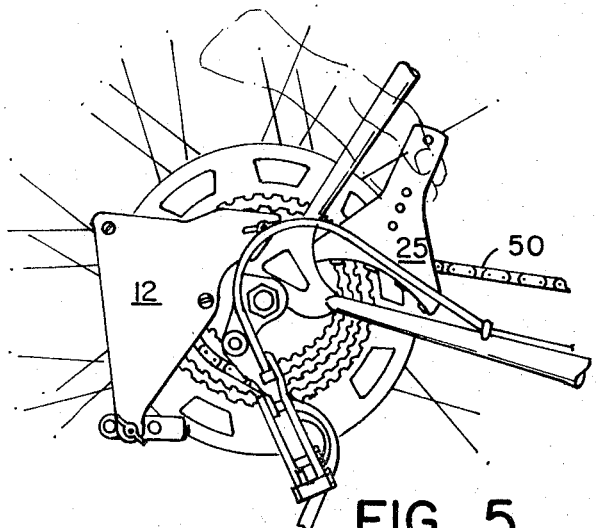
FIG_5
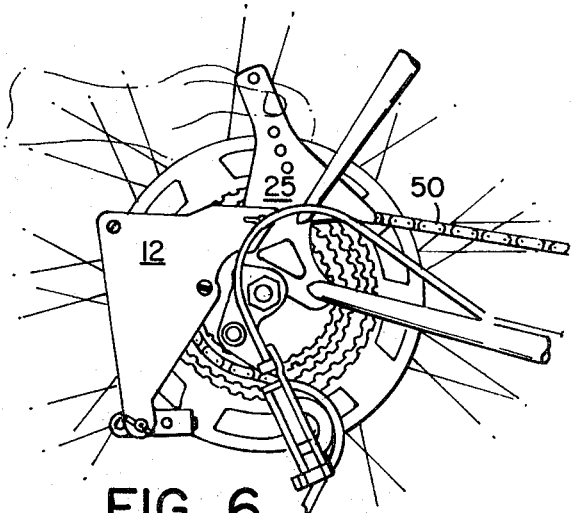
FIG_6
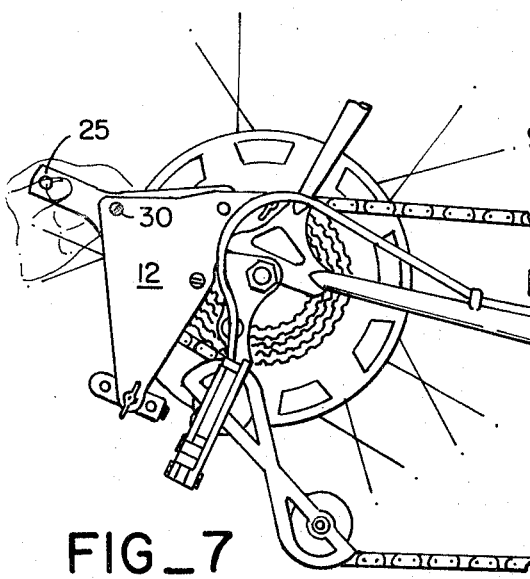
FIG_7
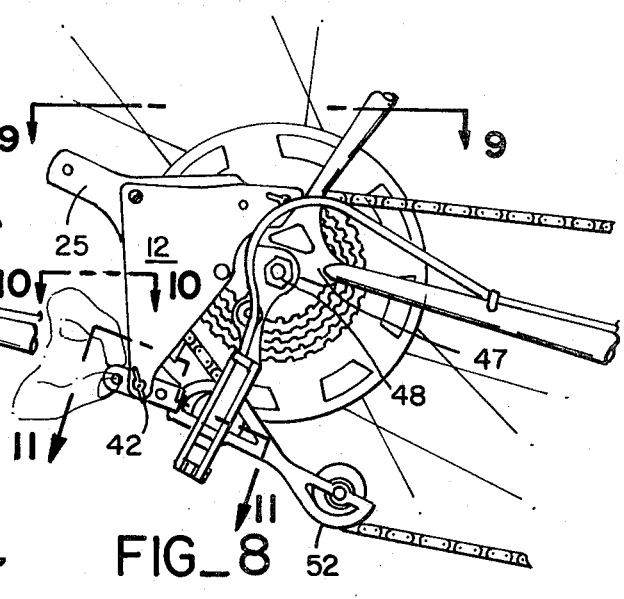
FIG_8

CHAIN POSITIONER FOR 10-SPEED BICYCLE

BACKGROUND OF THE INVENTION

1. FIELD OF THE INVENTION

This invention relates to devices having chain driven wheels, such as bicycles, motorcycles and the like. More particularly, this invention relates to chain driven wheels having a device for maintaining proper chain tension.

2 DESCRIPTION OF THE PRIOR ART

Many devices are known which employ a chain driven sprocketed wheel and a tensioning mechanism for maintaining proper tension on the chain. The presently popular multi-speed bicycle is perhaps the best known apparatus utilizing such a chain drive system. In such bicycles, the rear wheel is provided with a gear cluster having individual gears of different radius, each providing a different gear ratio. A shifting mechanism enables the chain to be passed from one gear to another in order to enable manual adjustment of the gear ratio. Due to the varying radius of the different gears, a variable chain tensioner mechanism, termed a derailleur, is provided in order to maintain proper chain tension.

In a typical arrangement, the wheel is mounted in a wheel frame or fork provided with a slotted opening for receiving the axle portion of the wheel and held in place by a pair of fastening nuts threaded onto opposing ends of the axle. To remove the wheel, the fastening nuts on the threaded wheel axle are slackened and the wheel axle is manipulated towards the open end of the slot. However, because the chain is ordinarily supported at the rear by the gears in the gear cluster, whenever the wheel is removed, support for the chain is lost and the chain collapses. Thus, when it becomes necessary to re-install the wheel the chain must be positioned manually to receive the gear teeth while the wheel axle is being manuvered at the same time in the slots in the rear fork.

The difficulty of this process of manipulating the wheel axle and simultaneously positioning the chain is compounded by the derailleur mechanism with the result that the installation of such a wheel becomes a time consuming, and sometimes exasperating, affair. Efforts to devise a simple, clean and efficient wheel installation procedure to date have not met with wide success.

SUMMARY OF THE INVENTION

The invention comprises a simple tool for facilitating removal and installation of a wheel having one or more gears in a cluster driven by a chain and chain tensioner assembly. In the preferred embodiment, the tool comprises an anchor plate adapted to be attached to the wheel fork adjacent the gear cluster, a chain positioner having a plurality of claw-like members for gripping and retaining the chain in a gear-teeth receiving configuration, and a member for securing the chain tensioner mechanism in a tension-relieving position. The anchor plate is provided with a stop member adapted to engage the rear edge of the wheel fork flange and is attached to the wheel fork by means of a single fastener. In a similar manner, the chain retractor and the chain tensioner retractor are each attached to the anchor plate by means of a single fastener.

In use, the anchor plate is first attached to the wheel fork frame outboard of the gear cluster by means of a single fastener with the stop nut abutting the rear edge of the fork flange. The chain retractor is next positioned forward of the gear cluster and the claws are engaged in the chain link apertures, after which the retractor is manipulated upwardly and rearwardly and fastened to the anchor plate with a chain in a retracted position. The chain tensioner is then manually moved to a tension relieving position and the chain tensioner retractor is secured thereto. The wheel may now be removed. Installation of the wheel proceeds in the reverse fashion.

For a further understanding of the nature and advantages of the invention, reference should be had to the following detailed description taken in conjunction with the accompanying drawings.

DESCRIPTION OF THE DRAWINGS

FIG. 1 is an exploded perspective view of the preferred embodiment;

FIG. 2 is a view of the inboard side of the chain retractor;

FIGS. 3–8 are side views illustrating installation of the preferred embodiment;

FIG. 9 is a partial plan view of FIG. 8;

FIG. 10 is a sectional view taken along lines 10—10 of FIG. 8;

FIG. 11 is a sectional view taken along lines 11—11 of FIG. 8.

DESCRIPTION OF THE PREFERRED EMBODIMENT

Turning now to the drawings, the preferred embodiment of the invention is shown in FIG. 1. An anchor plate 12 is provided with a slot 13 adapted to be aligned with an aperture in the accessory mounting boss of the rear fork of a multi-speed bicycle. Slot 13 is dimensioned to accomodate the accessory bolt hole found on most bicycle rear forks. A bolt 14 and wing nut 15 are provided for securing anchor plate to the bicycle fork flange. An alternate mounting hole 16 is provided for bicycles having a different accessory bolt hole placement, notably bicycles manufactured by the Schwinn Company.

A spacer nut 18 having an internally threaded narrowed neck portion 19 and an enlarged head portion 20 with an inner face 21 is secured to the inboard face of anchor plate 12 by means of a fastening bolt 23 which passes through an aperture 24. Neck portion 19 of stop nut is dimensioned to provide sufficient clearance to enable inner surface 21 of stop nut 18 and the inboard surface of anchor plate 12 to straddle the widest encountered fork flange.

A chain retractor 25, best shown in FIG. 2, is provided with a plurality of claw-like projections 26 arranged along a generally arcuate path. The radius of curvature of this arcuate path is preferably greater than the radius of curvature of the largest gear in a typical gear assembly. In the preferred embodiment, projections 26 are mutually spaced by a distance equal to the interstitial separation distance of alternate links of a standard bicycle chain. A plurality of mounting apertures 28 are provided in chain retractor 25 for enabling chain retractor 25 to be secured to anchor plate 12 in a variety of radial positions.

Chain retractor 25 is secured to anchor plate 12 by means of a fastener bolt 30 adapted to pass through a mounting aperture 31 and one of mounting apertures 28, a spacer 32 and a fastening nut 33. While not critical, the axial length of spacer 32 should be sufficiently great to locate chain retractor 25 with the inboard surface thereof adjacent the outer gear of the gear cluster in the wheel to be removed.

A chain tensioner retractor 35 has a hook-like projection 36 adapted to engage a chain tensioner in the manner described below. A plurality of mounting apertures 38 are provided in chain tensioner retractor 35 to facilitate assembly thereof to anchor plate 12 in a variety of extended positions. Chain tensioner retractor 35 is secured to anchor plate 12 by means of a fastening bolt 40 adapted to pass through a mounting aperture 41 and one of mounting apertures 38, and a fastener nut 42.

The manner in which the preferred embodiment may be employed to retain a chain for facilitating wheel removal and installation is best understood with reference to FIGS. 3–8. Fig. 3 shows the central portion of a rear multi-speed bicycle wheel including a hub 45 having a gear cluster 46. Hub 45 is supported in an open slot in a rear fork flange 47 and secured thereto by means of a fastening nut 48. Rear fork flange 47 is provided with a standard accessory boss having a mounting aperture 49. A chain 50 is engaged with one of the gears in gear cluster 46. Chain 50 is tensioned by means of a derailleur mechanism 52 controlled by a shift cable assembly 53.

To install, chain 50 is first positioned on the outermost gear of gear cluster 46. Anchor plate 12 is mounted outboard of rear fork flange 47 by passing fixing bolt 14 through the accessory aperture 49 and mounting slot 13 and loosely threading wing nut 15 onto the end of the bolt. Anchor plate 12 is then arranged with the neck portion 19 of stop nut 18 abutting against the edge surface of the rear portion of rear fork flange 47. Wing nut 15 is now secured tightly.

Chain retractor 25 is next positioned forward of gear cluster 46 in the manner shown in FIG. 5 with projections 26 facing inboard, and manuvered by hand until projections 26 engage the interstices of alternate links in chain 50. Once so engaged, chain retractor 25 is manually raised and manipulated in a generally counter-clockwise fashion to lift the chain 50 from the gear teeth. After attaining the FIG. 7 position, chain retractor 25 is moved radially outwardly to a suitable position in which one of apertures 28 is aligned with aperture 31 in anchor plate 12. While holding chain retractor 25 in this position, bolt 30 is inserted through aligned apertures 28, 31 and wing nut 33 is threaded onto bolt 30 until tight. At this point in the installation process, chain 50 is held in a position in which chain 50 is free of the gear teeth on gear cluster 46. Lastly, derailleur mechanism 52 is rotated generally counter-clockwise until projection 36 of chain tensioner retractor 35 is engaged with the left aperture of the derailleur pantograph as shown in FIG. 8. Thereafter, nut 42 is threaded securely onto fixing bolt 40 thereby providing a fixed support for maintaining derailleur 52 in the tension relieving position illustrated.

The relative placement of the various elements of the preferred embodiment when the tool is completely installed may be best understood with reference to FIGS. 9–11. As shown in FIG. 9, when properly installed, spacer nut 18 of anchor plate 12 abuts the rearward edge of fork flange 47 so that flange 47 is embraced by innerface 21 of nut 18 and the inboard face of anchor plate 12. Chain retractor 25 is positioned outboard and adjacent the outer-most gear of gear cluster 46 in order to retain chain 50 in a position of which the teeth on the outer-most gear may be readily inserted through the interstices of chain 50 when re-installing the wheel. As shown in FIG. 10, each projection 26 engages the interstitial portion of a single link of chain 50 in order to provide positive engagement therewith. With reference to FIG. 11 projection 36 of chain tensioner retractor 35 engages the outboard pantagraph arm of derailleur mechanism 52 in clasp-like fashion.

After removal, re-installation of the wheel proceeds in the reverse manner from that described above. Thus, the wheel axle is inserted in the open slot in fork flange 47, manuvered to the correct position, and secured by tightening axle nut 48. Thereafter, wing nut 42 is loosened and chain tensioner retractor 35 is disengaged from derailleur 52, permitting derailleur 52 to rotate generally clockwise to a tensioning position. Next, chain retractor is grasped and nut 33 is removed along with fastening bolt 30. Thereafter, chain retractor 25 is manually urged in a generally clockwise fashion to reposition chain 50 on the teeth of the outermost gear of gear cluster 46. When chain retractor 25 has been manipulated to the FIG. 5 position it may then be removed. Finally, anchor plate 12 is removed from fork flange 47 by unscrewing nut 15 and withdrawing fastening bolt 12. The wheel is not completely installed.

As will now be apparent, the invention provides a simple, efficient and speedy means for removing and installing multi-speed bicycle wheels having a gear cluster and an associated chain tensioner assembly. When not in use, the preferred embodiment may be stored as a unit with chain retractor 25 secured to anchor plate 12 by means of bolt 30 and nut 33 and chain tensioner retractor 35 fastened to anchor plate 12 by means of fastening bolt 40 and nut 42. While the above provides a full and complete disclosure of the preferred embodiment various modifications, alternate constructions and equivalents may be employed without departing from the true spirit and scope of the invention. For example, anchor plates having other configurations than that depicted may be found more suitable with other types of geared wheels than those commonly employed with multi-speed bicycles. Likewise, chain retractor 25 may be provided with projections 26 arranged at different spaced intervals from those depicted. In addition, the invention may be employed with chain driven geared wheels other than those used on multi-speed bicycles. Therefore, the above description and illustrations should not be construed as limiting the scope of the invention, which is solely defined by the appended claims.

What is claimed is:

1. A tool for facilitating removal and installation of a sprocketed wheel having at least one toothed gear driven by a chain and a chain tensioner assembly, said gear being removably carried by a frame, said tool comprising:

an anchor plate adapted to be secured to said frame for providing substantially rigid support relative thereto;

means for supporting said chain in a stable, retracted position while said gear is removed from the frame, said means comprising a chain retractor including an edge portion having at least one projection engageable with at least one of the interstices of said chain; and means for securing said chain retractor to said anchor plate in said retracted position, whereby said chain is maintained in a stable configuration during the removal of said wheel from the frame and the reinstallation of said wheel in said frame.

2. The apparatus of claim 1 wherein said edge portion of said chain retractor has a generally arcuate shape with a plurality of projections spaced therealong, each said projection being engageable with a different one of a plurality of the interstices of said chain.

3. The apparatus of claim 2 wherein the separation distance between adjacent ones of said projections is substantially equal to the distance between alternate interstices of said chain.

4. The apparatus of claim 1 further including a chain tensioner retractor adapted to be coupled to said chain tensioner for maintaining said tensioner in a tension relieving position on said chain; and means for securing said chain tensioner retractor to said anchor plate.

5. The apparatus of claim 4 wherein said chain tensioner retractor comprises an elongated member having a projection adapted to be engaged with an aperture in said chain tensioner.

6. The apparatus of claim 4 wherein said chain tensioner retractor is provided with means for enabling said chain tensioner retractor to be mounted to said anchor plate in varying locations relative thereto.

7. A tool for facilitating removal and installation of a multi-speed bicycle wheel carried by a frame and having a gear cluster with a plurality of gears associated with a chain and a chain tensioner assembly, said tool comprising;

an anchor plate adapted to be secured to said frame for providing a substantially rigid support relative thereto;

a chain retractor for supporting said chain in a retracted position independently of said gear cluster, said retractor including an edge portion having at least one projection engageable with at least one of the interstices of said chain;

means for securing said chain retractor to said anchor plate in said retracted position so that said chain is maintained in a configuration wherein at least one of said gears is readily alignable with said interstices when said wheel is installed in said frame;

a chain tensioner retractor adapted to be coupled to said chain tensioner for maintaining said tensioner in a position relieving tension on said chain; and means for securing said chain tensioner retractor to said anchor plate.

8. The apparatus of claim 7 wherein said edge portion of said chain retractor has a generally arcuate shape with a plurality of projections spaced therealong, each said projection being engageable with a different one of a plurality of the interstices of said chain.

9. The apparatus of claim 8 wherein the separation distance between adjacent ones of said projections is substantially equal to the distance between alternate interstices of said chain.

10. The apparatus of claim 7 wherein said chain tensioner retractor comprises an elongated member having a projection adapted to be engaged with an aperture in said chain tensioner.

11. The apparatus of claim 7 further including means for enabling said chain retractor and said chain tensioner retractor to each be mounted to said anchor plate in varying locations relative thereto.

* * * * *